(12) United States Patent
Rogers et al.

(10) Patent No.: US 7,825,654 B2
(45) Date of Patent: Nov. 2, 2010

(54) CALIBRATION OF A GENERATOR DEVICE

(75) Inventors: Bruce W. Rogers, Glendale, AZ (US);
John R. Leonard, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 714 days.

(21) Appl. No.: 11/771,055

(22) Filed: Jun. 29, 2007

(65) Prior Publication Data

US 2009/0001830 A1    Jan. 1, 2009

(51) Int. Cl.
*G01R 35/00* (2006.01)
(52) U.S. Cl. .......................... 324/202; 73/1.37; 73/1.41
(58) Field of Classification Search ......... 324/160–161, 324/164, 202, 207.25; 73/514.31, 514.39, 73/1.37, 1.41
See application file for complete search history.

(56) References Cited

U.S. PATENT DOCUMENTS

| | | | | |
|---|---|---|---|---|
| 2,301,115 A | * | 11/1942 | Gilbert | 324/163 |
| 3,811,091 A | * | 5/1974 | Ha et al. | 324/175 |
| 5,389,909 A | * | 2/1995 | Havens | 335/216 |
| 5,537,728 A | * | 7/1996 | Van Mourik | 29/467 |

\* cited by examiner

*Primary Examiner*—Bot L LeDynh
(74) *Attorney, Agent, or Firm*—Ingrassia Fisher & Lorenz, P.C.

(57) ABSTRACT

Methods are provided for calibrating a tachometer or generator device to reduce residual errors associated with the tachometer-generator device. A shim structure is positioned within the air gap of the tachometer-generator device. A physical characteristic or location of placement of the shim structure is selected to reduce variation in an output voltage of the tachometer-generator device.

15 Claims, 9 Drawing Sheets

CALIBRATION OF A GENERATOR DEVICE

TECHNICAL FIELD

The present invention generally relates to tachometers or generators, and more particularly relates to a method for calibrating a tachometer or generator.

BACKGROUND

A generator such as a permanent magnet generator may be configured to produce flat-topped alternating current (AC) waveforms. The amplitude and frequency of these waveforms are proportional to the rotational speed of the generator. The generator may be used as a precision tachometer, for example, in a motion control system, if the output signals of the tachometer are suitably commutated.

The performance of such a unit depends on the unit's ability to produce a nearly perfect DC output for a constant rotation speed. The tachometer is designed to create a constant magnetic field strength and excite a constant number of turns as the magnet rotates, so that the only variable affecting output voltage is the rotational speed.

However, generator devices configured, for example, as the foregoing tachometer device, include a variety of residual errors. Error sources may include, but are not limited to, magnetic material properties, mechanical roundness, flatness, asymmetry and alignment, winding placement, magnetic leakage paths, shielding effects, and the influence of nearby magnetic sources or materials. The errors manifest themselves primarily as ripple components in the signal related to harmonics of the rotational frequency and the pole count of the device.

Practical manufacturing methods and non-ideal material properties inevitably result in an imperfect product. Accordingly, it is desirable to implement a method to compensate for the residual errors found in generator devices. In addition, such a method should be cost-effective, not resulting in the expenditure of large resources, and be compatible across an entire line of device designs. Furthermore, other desirable features and characteristics of the present invention will become apparent from the subsequent detailed description of the invention and the appended claims, taken in conjunction with the accompanying drawings and this background of the invention.

BRIEF SUMMARY

In one embodiment, a method is provided for calibrating a tachometer device. A shim structure is positioned within the air gap of the tachometer device. A physical characteristic or location of placement of the shim structure is selected to reduce variation in an output voltage of the tachometer device.

In another embodiment, a method is provided for a method for reducing residual errors in a generator. A first waveform of the generator is measured to identify the residual errors. A shim structure is positioned within the air gap of the generator. The shim structure has a physical characteristic selected to magnetically compensate for at least one of the residual errors. A second waveform of the generator is measured. The first and second waveforms are compared.

In still another embodiment, a method of manufacturing a precision tachometer device is provided. A shim structure is provided which is configured to be positioned within the air gap of the tachometer device. A physical characteristic or location of placement of the shim structure is selected to reduce variation in an output voltage of the tachometer device.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Residual errors in devices such as tachometer-generator devices can be reduced or eliminated by the introduction of a magnetic material into the gap between the rotor magnet and the stator windings of the devices. In some cases, the material is relatively thin as opposed to a width of the material. As such, the material can be referred to as a "shim" structure. Throughout the following, use of the term "shim" may refer to a material of varying length, width, height, depth, shape, or other physical properties which will be later described. The magnetic properties of the shim structure affect the overall magnetic field strength of the tachometer-generator device, and therefore, the magnitude of the induced voltage of the device.

Figure 1:
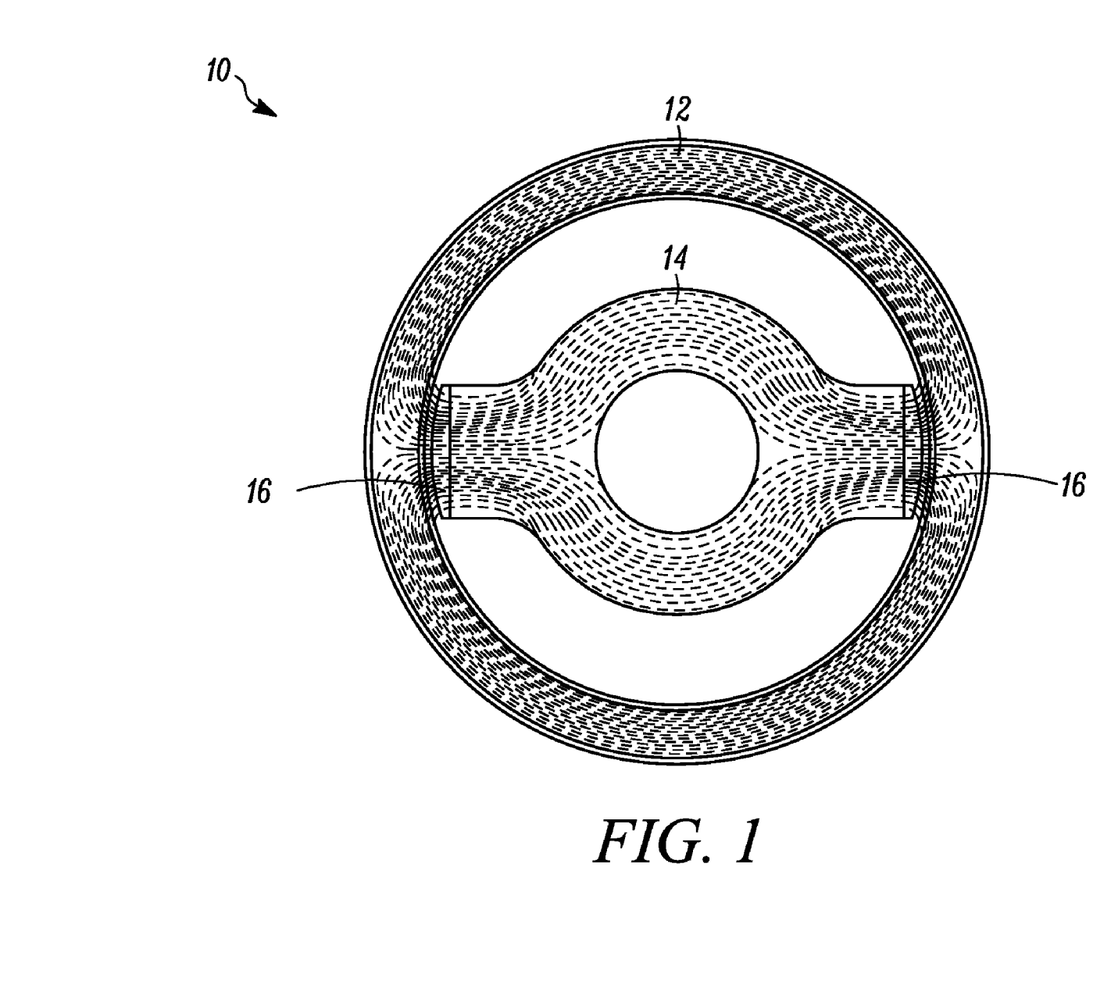
FIG. 1 illustrates an exemplary toroidal-wound tachometer-generator device.

Turning to FIG. 1, an exemplary tachometer-generator device 10 is illustrated. Device 10 may include a toroidal-wound (analog) device which is commonly employed in precision rate control systems, and particularly in control moment gyro (CMG) gimbal systems. Device 10 includes a stator 12 portion, which is typically a stationary structure having a core over which a plurality of windings are disposed. Device 10 also includes a rotor 14, which rotates at a particular angular frequency. In the depicted embodiment, two permanent magnets 16 are disposed on opposing sides (poles) of the rotor.

A device 10 such as a toroidal-wound tachometer produces a voltage output which is proportional to the product of flux density, the length of the active winding, and velocity, according to the following equation:

$$E = B * l * v \tag{1}$$

where E represents the output voltage,

B represents the flux density (measured in Teslas)

l represents the length of the active winding, and v represents velocity.

Residual errors associated with device 10 can result from manufacturing imperfections. The residual errors cause variations of the tachometer-generator output signals (i.e., output voltage) which can be thought of as harmonic distortion. These residual errors can be position dependant. Examples of manufacturing imperfections include the toroid roundness, or conductor spacing of the device 10 as previously described. This harmonic distortion results in unwanted disturbances to the control loop which utilizes the device 10 for such uses as velocity feedback.

A corresponding output waveform of device 10 can be measured with a suitable test setup. In such a test setup, the rotational rate of the unit may be controlled to a precision in excess of a specified performance target. During the measurement process, the output signals (i.e., output voltage) corresponding to a respective rotational position are recorded.

Figure 2:
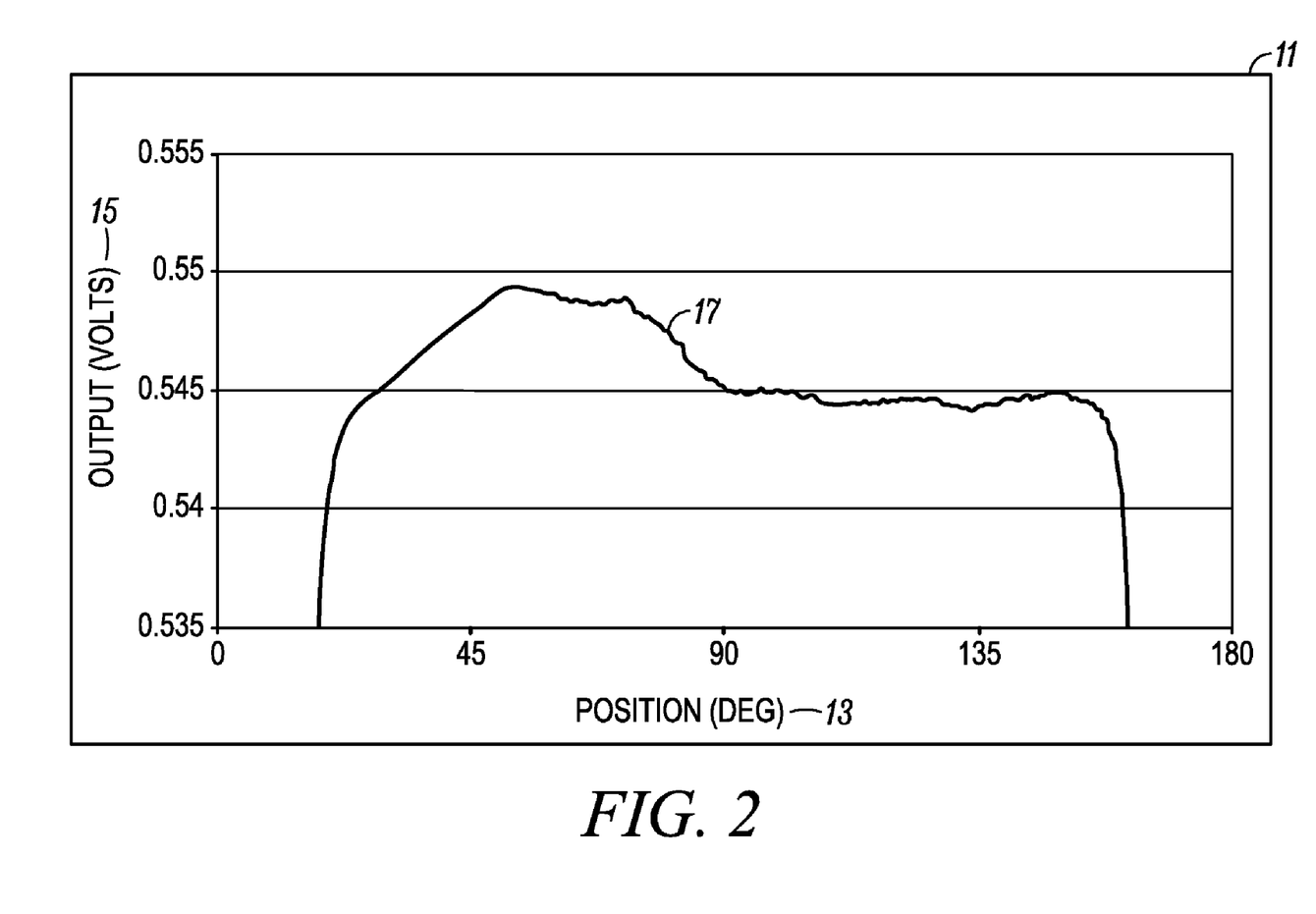
FIG. 2 illustrates an exemplary output waveform of a toroidal-wound tachometer-generator device.

FIG. 2 illustrates an exemplary plot 11 of an output waveform 17 of a device 10. The x-axis 13 is a respective rotational position of device 10 in degrees. Output 15 in volts is shown along the y-axis. The so-called "active region" of the depicted waveform 17 is the central region of the waveform 17 (i.e., surrounding about 90 degrees position). The waveform 17 peaks at approximately 50 degrees, with a corresponding output voltage of approximately 0.53 volts. From the peak, the output voltage gradually decreases before settling at an approximate voltage of 0.545 volts. In contrast to waveform 17, an ideal waveform is flat-topped. As a result, an ideal waveform 17 would have a waveform which would increase nearly vertically until a peak was reached (i.e., 0.53 volts). The output voltage would stay nearly constant until a position outside of the active region was achieved.

Figure 3:
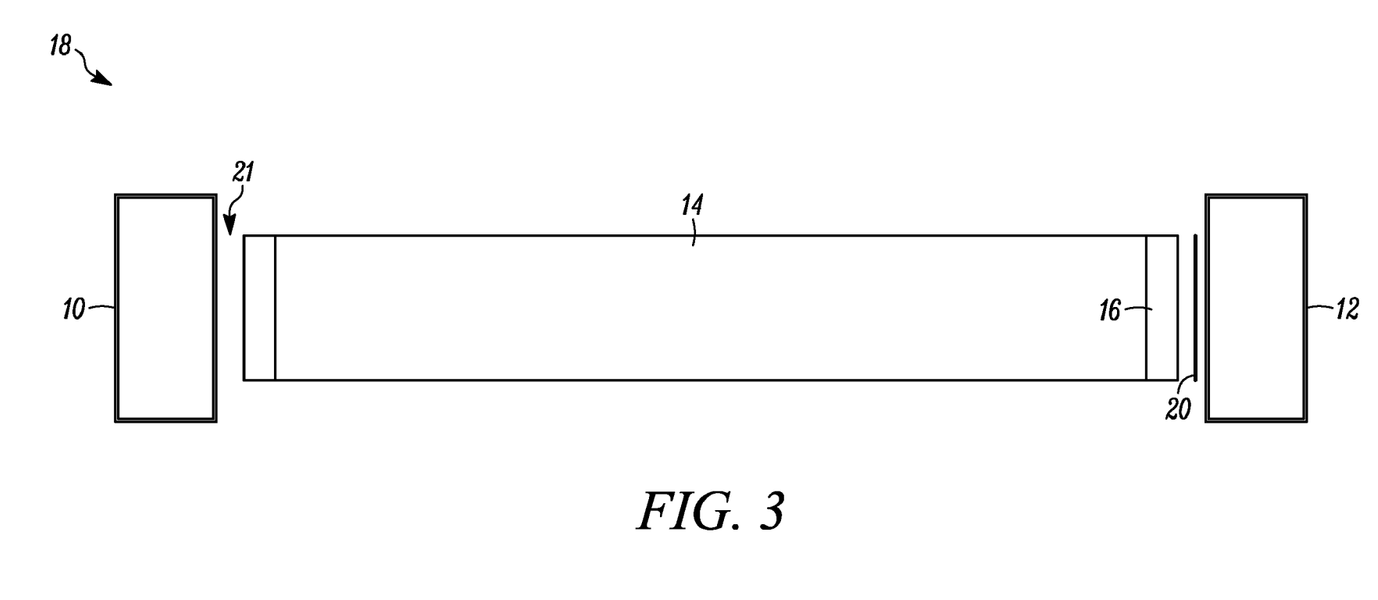
FIG. 3 illustrates the positioning of a shim structure in the air gap of an exemplary tachometer-generator device.

The output signals of a device 10 can be, in effect, "tuned" by positioning of appropriately shaped shim structures within the air gap, thereby selectively changing the reluctance of the magnetic circuit. In one embodiment, the shim structures can be positioned at the inside diameter (ID) of the stator 12, adjacent to the windings. FIG. 3 illustrates an exemplary positioning 18 of a shim structure 20 within the air gap 21 of a device 10 as shown. The magnetic reluctance of the stator 12 is only affected where the magnets 16 "see" the shim device 20.

The effect of a shim structure 20 of magnetic material in the air gap 21 can be determined by modeling and by experimentation. Positioning of shim structures 20 can be effective whether the added material adds or subtracts from the magnetic field strength, and thereby, the generated voltage.

Shim structure 20 can be fabricated to a suitable shape, and can incorporate other desired physical characteristics, such as length, width, or depth characteristics. In one embodiment, a suitably shaped thin "calibration" shim 20 is constructed of a magnetic steel alloy material. The metal or metal alloy material which comprises the shim 20 can also be considered a physical characteristic which can be selectable and variable to suit a particular application and/or produce a desired effect or result. The thickness and/or width of the shim structure 20 can be varied in proportion to the correction factor desired at a given position as determined by the recorded waveform (such as waveform 17). The variation of magnetic field strength in the gap, due to the presence of the shim structure 20, precisely cancels error sources in the device 10 and produces a more perfect output waveform, as will be seen.

Use of a shim structure 20 provides a method to compensate for residual errors on a completed device 10. By obtaining a pre-shim output waveform, the cumulative effect of one or more manufacturing imperfections, some of which may not be fully understood or controllable, can be measured. The shim structure 20 provides a compensating means to achieve an improved end result. Following the placement of the shim 20, the output waveform can again be recorded and the two waveforms can be compared for improvement.

Figure 4:
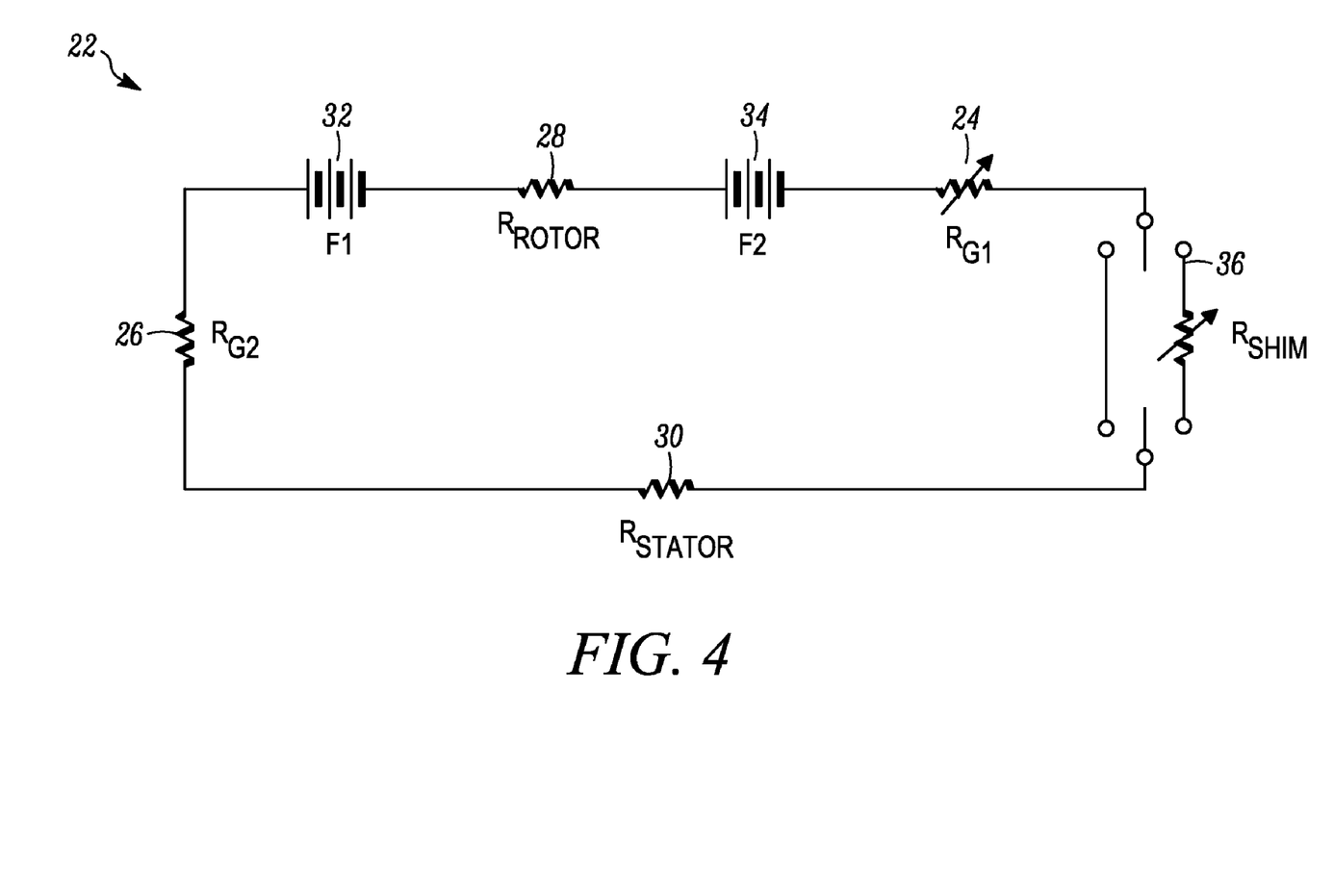
FIG. 4 illustrates an exemplary equivalent circuit representation of a tachometer-generator device having a shim structure.

Device 10 can be modeled using an equivalent electrical circuit methodology. FIG. 4 illustrates such an equivalent circuit 22. Physical characteristics such as reluctances of the air gap (Rg1, Rg2) are modeled by variable resistor 24 and resistor 26, respectively. Reluctance values of the rotor and stator are shown as Rrotor 28 and Rstator 30 resistor equivalents. Equivalent batteries 32 and 34 are also seen which model the magnetomotive force (e.g., F1 and F2) applied to the circuit 22. As shown, each of the components 24, 26, 28, 30, 32, and 34 are coupled in series. Finally, the reluctance of the shim is shown as a variable resistor 36 also coupled in series.

The total magnetic reluctance of the equivalent circuit 22 when the magnet 16 "sees" the shim can be defined as:

$$R_T = (Rg1 + Rshim) + Rg2 + Rrotor + Rstator \tag{2}$$

where $R_T$ refers to the total magnetic reluctance,

Rg1 and Rg2 refer to reluctances of the air gap,

Rshim refers to the reluctance of the shim structure,

Rrotor refers to the reluctance of the rotor, and

Rstator refers to the reluctance of the stator.

And the total magnetic reluctance of the equivalent circuit 22 when the magnet 16 does not see the shim can be defined as:

$$R_T = Rg1 + Rg2 + Rrotor + Rstator \tag{3}$$

Figure 5:
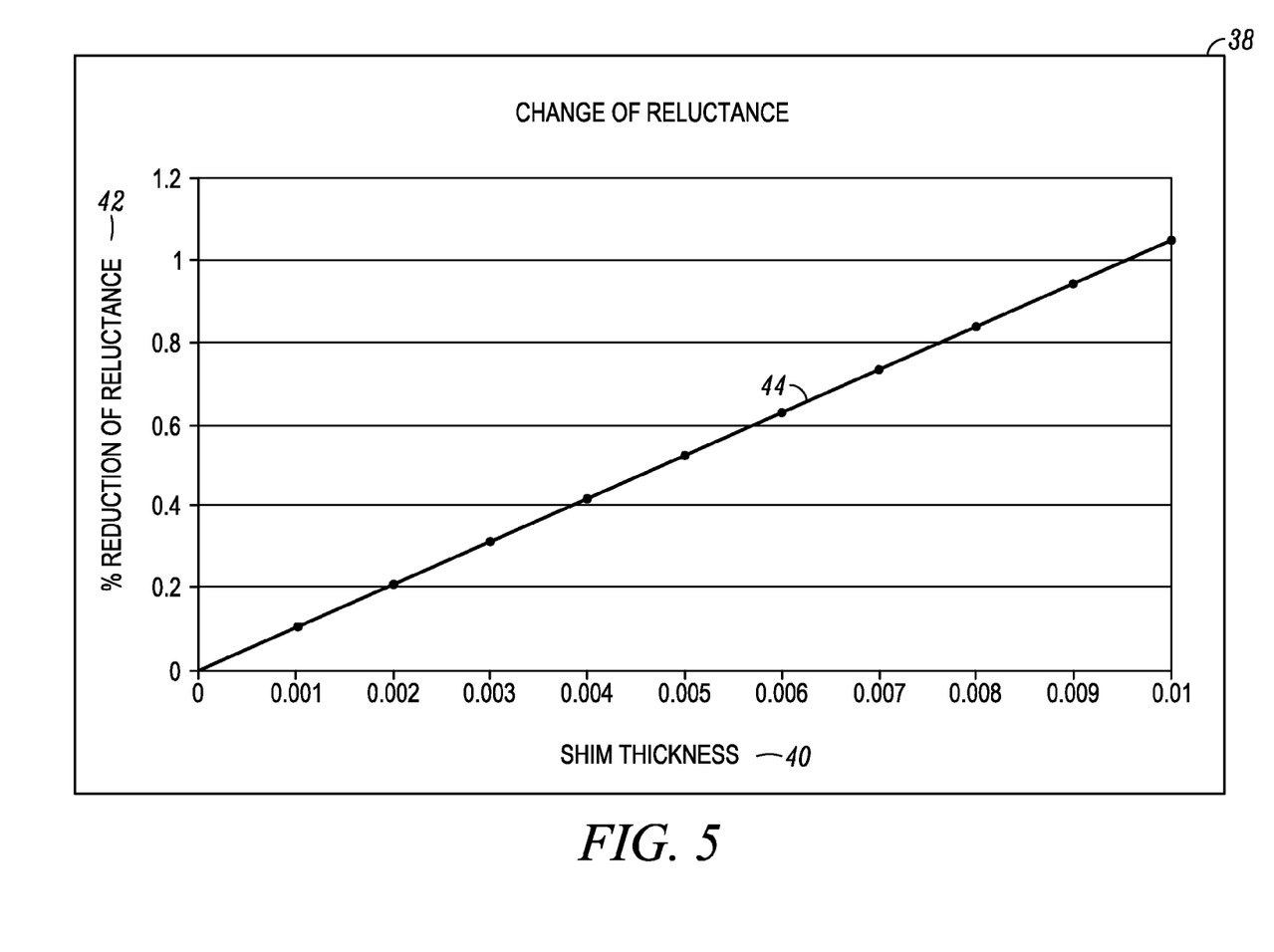
FIG. 5 illustrates a change of magnetic reluctance expressed as a percentage reduction of reluctance in proportion to a thickness of a shim structure.

Reluctance as a function of shim thickness can be calculated using approximate dimensions and physical properties of the device 10. FIG. 5 illustrates exemplary reluctance 38 as a function of shim thickness. The respective shim thickness 40, in thousandths of an inch, is expressed along the x-axis, while the percentage change in reduction of reluctance 42 is expressed along the y-axis. In the depicted exemplary function, the percentage reduction of reluctance varies approximately linearly in proportion to the shim thickness. The thicker the shim thickness 40, the greater the corresponding percentage reduction of reluctance 42. Again, as a result, the thickness or depth of shim 20 as a physical characteristic can be varied to produce a desired effect.

A calibration or "correction" shim structure 20 can be designed accordingly to provide an appropriate percentage reduction of reluctance corresponding to a particular rotational position of the device 10, in accordance with a particular thickness of the shim 20. In addition, the effectiveness of the shim structure 20 can be varied by a width, or length, height, or shape characteristic in the active air gap 21. A shim 20, for example, can be deliberately shaped to have an effect inverse to the measured waveform distortion, thus partially cancelling the waveform distortion.

Figure 6A:
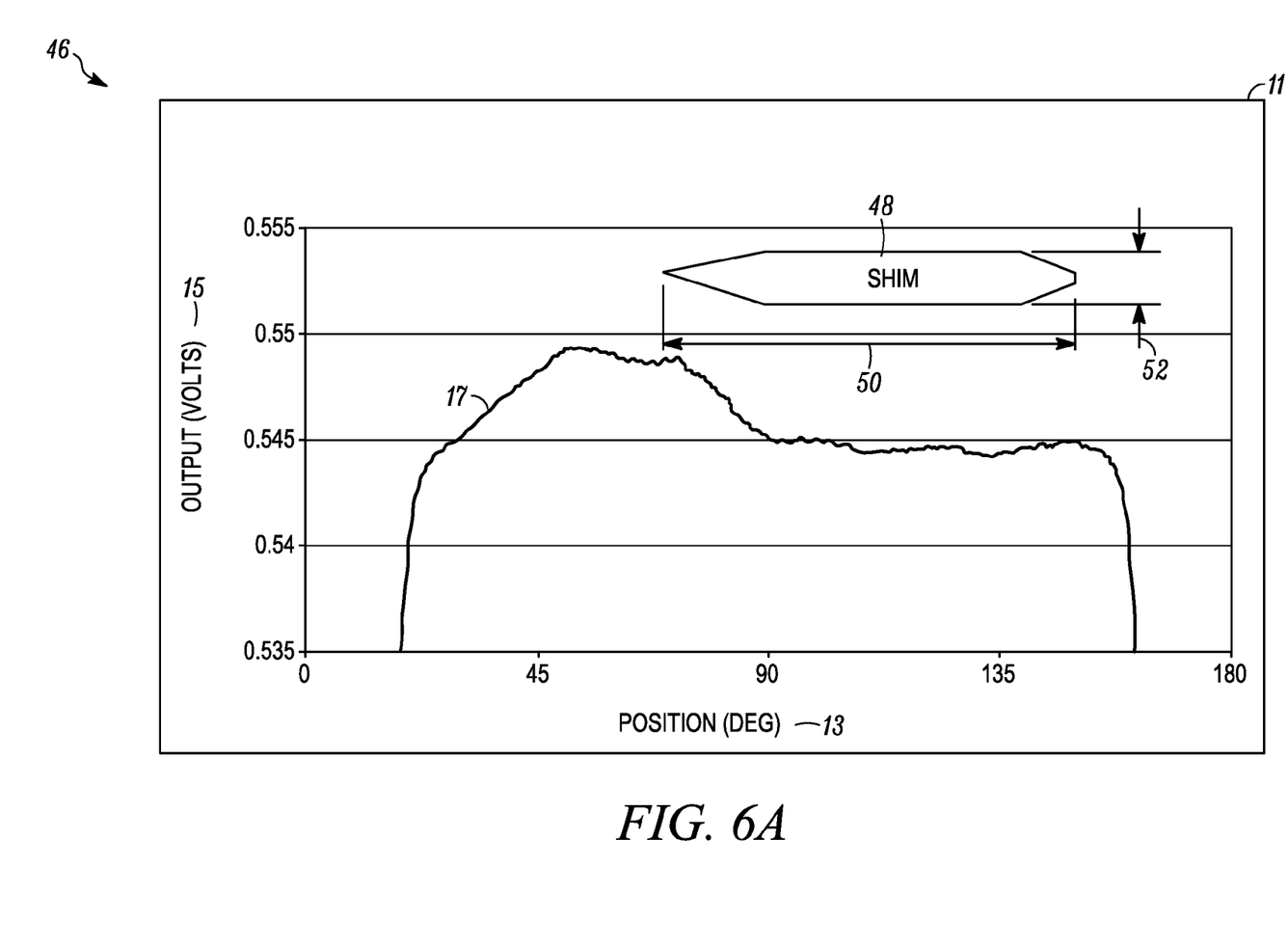
FIG. 6A illustrates a first exemplary waveform of a tachometer-generator device and a corresponding proposed shim structure to improve waveform flatness.

Shims 20 can be selectively shaped to improve waveform flatness. Turning to FIG. 6A, a first exemplary illustration 46 of the process of selectively designing a particularly shaped shim 48 to correspond to a particular waveform, is depicted. The waveform 17 shown was earlier depicted in FIG. 2, exhibiting variation in output voltage across the active region of the waveform 17. Here, as in FIG. 2, rotational position 13 in degrees is again seen along the x-axis. Output 15 in volts is again seen along the y-axis. To help compensate for the waveform 17 flatness, a shim structure 48 is designed having a length 50 of about 6.0 inches and a width 52 of about 0.5 inches. As can be seen, the length or width of the corresponding shim 48 design can vary according to the variation of the output voltage waveform 17.

Figure 6B:
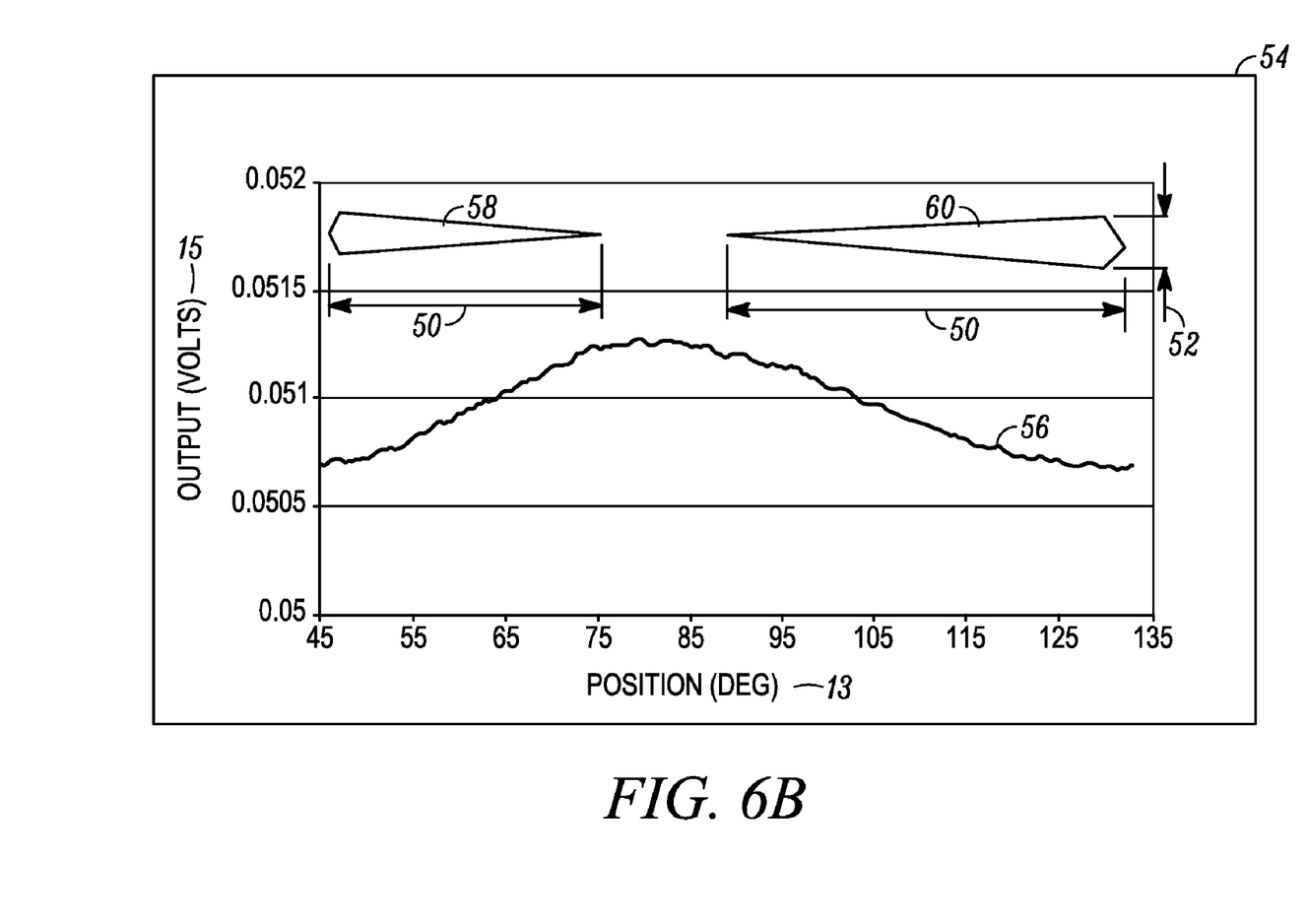
FIG. 6B illustrates a second exemplary waveform of a tachometer-generator device and a plurality of corresponding proposed shim structures to improve waveform flatness.

A second exemplary illustration 54 of selectively designing a shim structure is depicted in FIG. 6B. Waveform 56, as seen, has a peak at roughly 80 degrees, with valleys on either side. As a result, a series of two shim structures 58 and 60, respectively, are designed and implemented to correspond with the valleys of the waveform 56. As seen, shim 58 is selectively designed to have a length 50 of about 2.0 inches, while shim 60 is selectively designed to have a length 50 of about 3.0 inches. Shim 60 is designed to have a width 52 of about 0.5 inches, which tapers gradually along the length 50 of the shim 60 as shown. As can be appreciated, any number of shim devices, incorporating a variety of shapes, materials, or other physical characteristics, can be fabricated in an effort to correct a particular waveform.

Figure 6C:
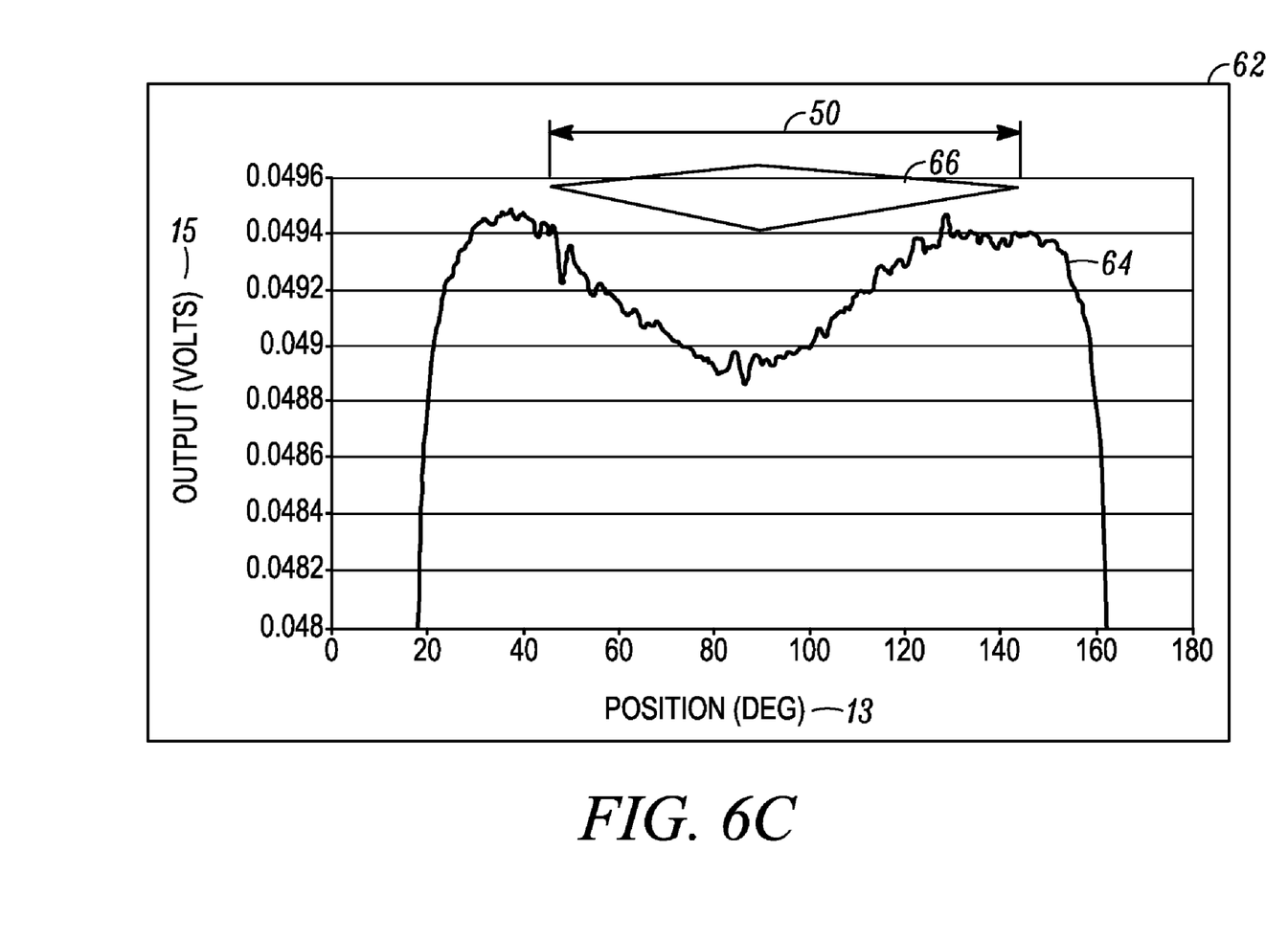
FIG. 6C illustrates a third exemplary waveform of a tachometer-generator device and a corresponding proposed shim structure to improve waveform flatness.

As can be appreciated, due to one or more residual errors, a waveform of a particular device 10 can appreciably vary from a waveform of another device 10. FIG. 6C illustrates such a third exemplary waveform, and an additional process 62 of selectively designing a shim to correspond to the waveform 64 to improve waveform flatness. As seen, waveform 64 has two corresponding peaks on opposing sides, with a valley in between. As such, shim 66 is designed in a diamond shape, having a length 50 of about 6.0 inches and a width which gradually tapers from a first end (at approximately the first peak), to a maximum width (at approximately the minimum point of the valley), then again tapering to a second end (at approximately the second peak).

Figure 7:
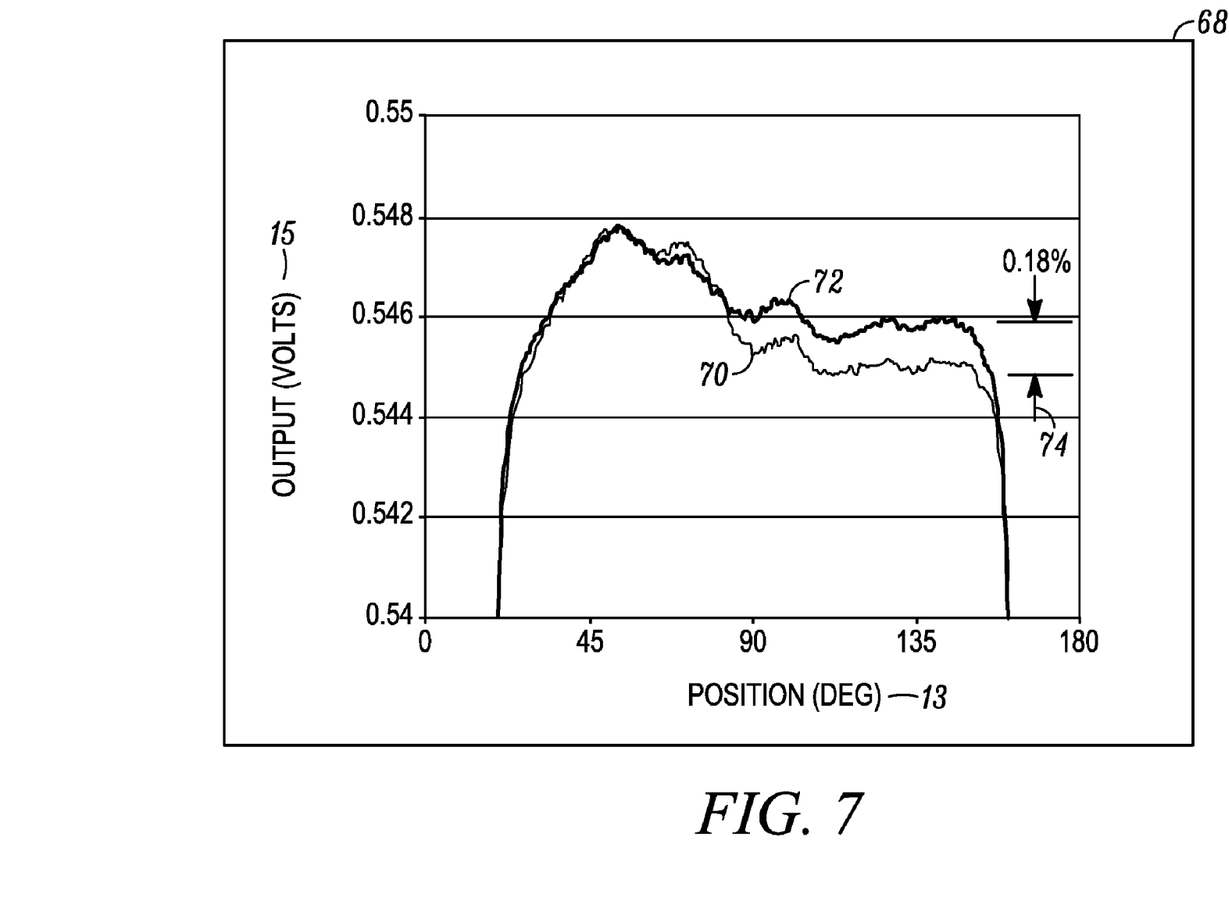
FIG. 7 illustrates an example of improved waveform flatness of an exemplary tachometer-generator device incorporating a shim structure.

FIG. 7 illustrates an example plot 68 of improved waveform flatness using a device 10. A baseline waveform 70 is seen, which has a corresponding greater percentage of output variation from approximately 90 degrees to 150 degrees of rotational position. A waveform 72 of a device 10, in which a shim structure 20 has been selectively designed and positioned, is also shown. The improved waveform 72 demonstrates an approximately 0.18% increase in output voltage across the rotational position range previously described (denoted by reference 74). Such an improvement 74 results in a flatter waveform across the active region of the waveform, resulting in greater device 10 precision.

Generator devices such as device 10, will again, have finite waveform errors due, at least in part, to manufacturing intolerances. The waveform of a particular device, such as device 10, can be measured to an arbitrary level of precision. Insertion or positioning of a thin shim, such as shim 20, which can be constructed of a magnetically soft material, will effect the magnetic circuit locally, and will modify the resultant waveshape corresponding to that particular rotor position. The shim thickness and shape can be tailored to produce a compensating effect on the waveform errors.

Tailoring the shim thickness and shape may be an empirical process, due to the incomplete knowledge and/or modeling of all of the effects in the magnetic circuit of the device. Several devices 10 originating from a single manufacturer, of having a similar design, can be tested. A pre-shim waveform, and a post-shim waveform may be obtained from one or several of these devices 10. In one embodiment, a mathematical algorithm may be generated which is representative of a physical characteristic of an exemplary device 10, or representative of a physical characteristic of a cumulative number of devices 10. Additionally, an additional mathematical algorithm may be generated which reflects a magnetic compensation of the shim structure of at least one of the residual errors. The mathematical algorithm can be applied to each of a cumulative number of devices 10 sharing one or more physical properties, manufacturing constraints, and so on, in order to model the calibration of a number of devices. A manufacturing technique can take such an algorithm into account, such as, for example, in a situation where shims are machined on a large scale in order to boost the precision of a large number of similar devices 10. As can be appreciated, the development and/or implementation of such an algorithm may take place with the assistance of a computer device having a processor, memory, communication, or similar component. Such an algorithm can, of course, be embodied in a computer program product which may be applied using the computer device.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of calibrating a tachometer device, comprising:
   positioning a shim structure, having a physical characteristic or placement location selected to reduce variation in an output voltage, within the air gap of the tachometer device.

2. The method of claim 1, wherein positioning the shim structure includes selecting a shape of the shim structure to correspond to a waveshape of the output voltage.

3. The method of claim 1, wherein positioning the shim structure includes selecting a metal or metal alloy material to comprise the shim structure based on a magnetic relationship between the metal or metal alloy material and the tachometer device.

4. The method of claim 1, further including positioning a magnetic steel alloy shim structure within the air gap of the tachometer device.

5. The method of claim 1, wherein positioning the shim structure includes forming a shim structure to have an associated magnetic effect which is inverse to a measured waveform distortion of the tachometer device.

6. The method of claim 1, further including measuring a waveform of the tachometer device.

7. The method of claim 1, further including integrating the shim structure into a package containing a stator of the tachometer device.

8. The method of claim 1, further including generating a mathematical algorithm representing a relationship between a reduction in a variation of output voltage of the tachometer device and the physical characteristic.

9. The method of claim 8, further including applying the mathematical algorithm to manufacture a plurality of additional shim structures having a similar physical characteristic.

10. A device for increasing precision in a tachometer comprising:
a shim structure configured to be positioned within an air gap of the tachometer and further configured to reduce variations in an output voltage as positioned.

11. The device of claim 10, wherein the shim structure is integrated into a package containing a stator of the tachometer.

12. The device of claim 10, wherein the physical characteristic includes a width, length, depth, or shape characteristic to correspond to a waveshape of the output voltage.

13. The device of claim 10, wherein the physical characteristic includes a metal or metal alloy material selected for a magnetic relationship between the metal or metal alloy material and the tachometer.

14. The device of claim 10, wherein the tachometer includes a toroidal-wound tachometer.

15. The device of claim 10, wherein a relationship between the physical characteristic or placement location and the variation in output voltage is modeled by a mathematical algorithm used to fabricate additional shim structures.

* * * * *